Nov. 4, 1952 — O. P. PIERSON — 2,616,359
FRYING APPARATUS
Filed June 10, 1949 — 2 SHEETS—SHEET 1
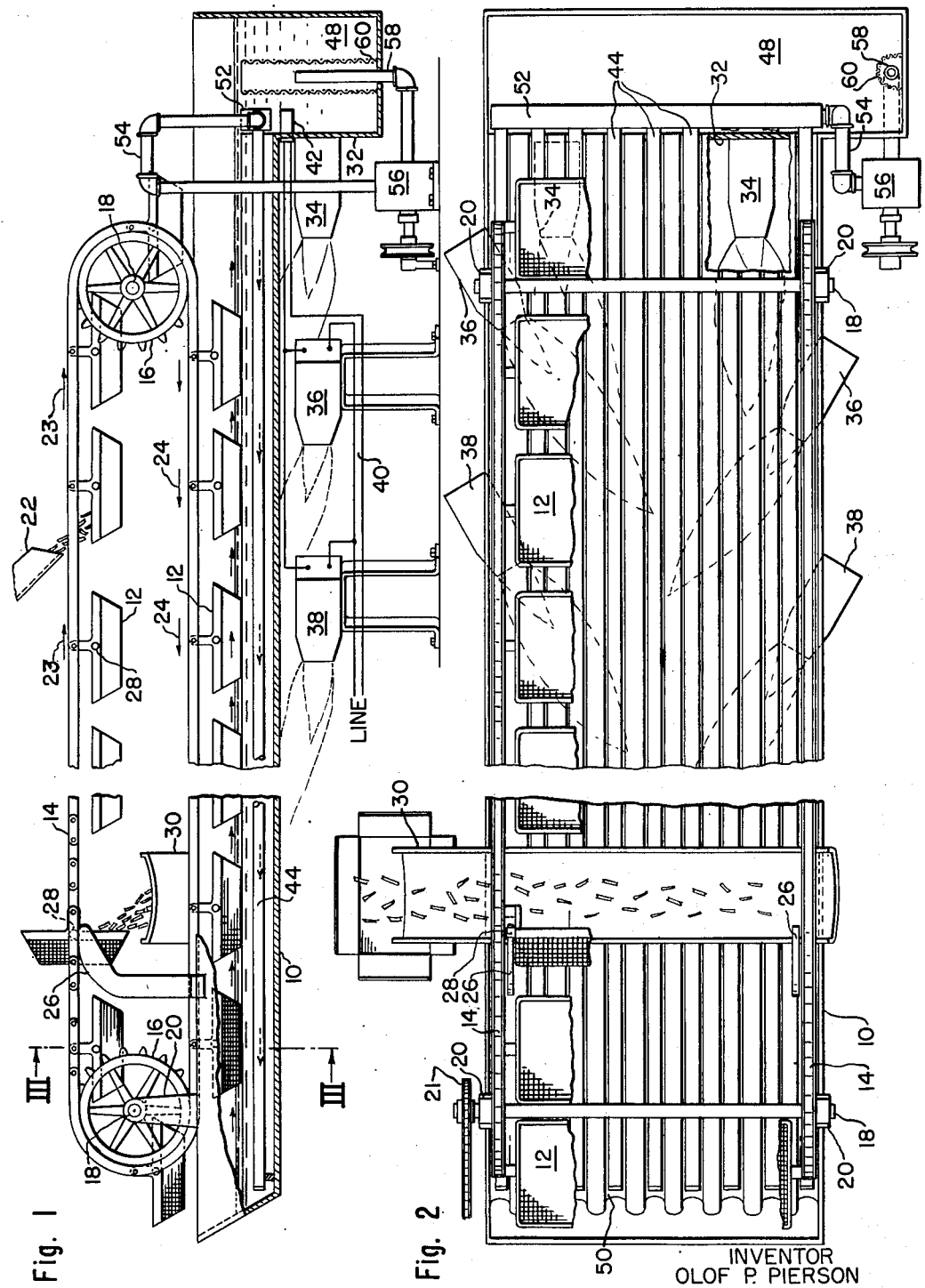
INVENTOR
OLOF P. PIERSON
BY HIS ATTORNEY
Edward W Fearing Nov. 4, 1952  O. P. PIERSON  2,616,359
FRYING APPARATUS Filed June 10, 1949  2 SHEETS—SHEET 2

INVENTOR
OLOF P. PIERSON
BY HIS ATTORNEY
Edward W Fearing

Patented Nov. 4, 1952

2,616,359

UNITED STATES PATENT OFFICE 2,616,359

FRYING APPARATUS

Olof P. Pierson, Caribou, Maine

Application June 10, 1949, Serial No. 98,205

9 Claims. (Cl. 99—407)

The present invention relates to food frying apparatus, particularly of the type in which an elongated kettle or pan of relatively shallow construction is employed for large scale frying operations.

Heretofore large scale frying operations have been rendered difficult and expensive for the reason that kettles or pans and their associated equipment must frequently be dismantled for cleaning and replacement of spent fat employed as a frying medium. A difficulty common with all frying operations and especially with those for large scale continuous production purposes has been in maintaining the fat at a proper frying temperature in the zone where the cold unfried food is first immersed. If the temperature of the fat surrounding food articles when they are first immersed is not well above 300 degrees Fahrenheit the fat will be absorbed to an excessive depth within the food, leaving a soggy improperly fried product which will not be improved by subsequent continued treatment, not being driven from the food articles by further frying operations. For this reason it is important to immerse cold food articles in fat heated to a proper high frying temperature which causes the articles to be seared when first immersed along their outer surfaces and thereby to be sealed against excessive fat absorption. By so doing the heat quickly strikes in toward the center of each food article, forcing out steam toward the surface and for all intents, cooking the article in the steam of its own water content.

Forcing out steam in normal frying operations causes a certain amount of solid or viscous residue also to be forced outside the articles, which residue tends to contaminate the fat and to fall to the bottom of a frying kettle as a gummy deposit. A deposit of frying residue on the bottom of a kettle ordinarily interferes with heat transfer to the fat when the most efficient known form of heater acting directly on the bottom of the kettle is employed. Accordingly, it has heretofore been the practice to construct a relatively deep kettle with a cool zone at its bottom for the deposit of frying residue. Heating is accomplished in such kettle by the use of a heating tube located partway up from the bottom of the kettle with the cool zone beneath the heating tube. Such an arrangement requires a kettle of large fat content relative to the volume of the food immersed therein at one time.

The object of the present invention is to provide a frying apparatus of especial effectiveness for continuous operation in which there is employed a small quantity of fat relative to the volume of the food immersed therein at any one time without encountering the difficulties above enumerated. Another object is to provide a high production frying kettle which may be operated continuously without the necessity at any time of replacing the fat employed therein except for that carried off on the surface of the food treated, the fat being maintained in acceptable condition. A further object is to simplify the construction and provide an extremely rigid form of elongated frying kettle of the type adapted to large scale production purposes, while retaining the advantages of heating the bottom of the kettle directly without the usual effects of fat contamination from frying residue or the gummy deposit of residue on the kettle bottom when heat is applied directly thereto.

In the accomplishment of these and other objects, the frying apparatus of the present invention comprises a shallow elongated kettle in which are disposed food carriers and the fat is circulated through a distributing pipe system, in which the pipe runs lengthwise of the kettle and has a series of openings spaced along it with a residue collecting sump constructed at one end of the kettle. If the openings in the pipe are directed against the bottom of the kettle, as in the present embodiment of the invention, a most beneficial result is obtained through the action of the flow of fat through the openings, clearing the bottom of the kettle and preventing a deposit of the residue thereon. With the use of a sump at the end of the kettle a replaceable continuously acting strainer may be inserted which may be emptied from time to time without interrupting the operation of the apparatus.

An important feature of the invention which contributes materially to the use of the fat circulating pipes resides in a corrugated bottom construction for the kettle having one or more valleys running lengthwise of the kettle and a distributing pipe in each valley, the openings in the pipe being directed against the valley bottom. Where the bottom of the kettle is heated directly and no cool zone is employed the danger of burning or carbonizing the residue into a hardened deposit is avoided while the most efficient form of known heat transfer is obtained. Furthermore, with the corrugations running lengthwise of the kettle great rigidity in a lengthwise direction results and at the same time no serious effects are produced from widthwise expansion, the corrugations providing some degree of flexibility in that direction.

These and other features, as hereinafter described and claimed, will readily be understood from a consideration of the following detailed specification taken in connection with the accompanying drawings, in which:

Fig. 1 is sectional view in side elevation, broken away and reduced in length, of a frying apparatus embodying the features of the present invention;

Fig. 2 is a similar view, but in plan of the apparatus shown in Fig. 1;

Figure 4:
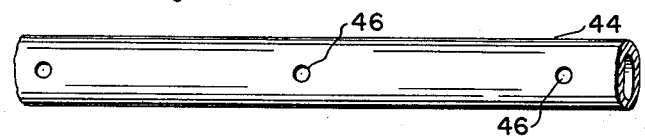
Figure 5:
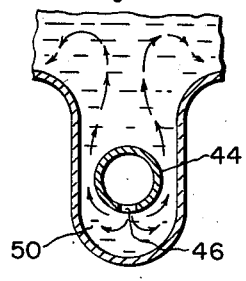

Fig. 4 is a detail bottom plan view on a further enlarged scale of a portion of the fat distributing pipe of the apparatus, showing the fat circulating openings; and Fig. 5 is a sectional view, partly diagrammatic, showing the circulating path taken by the fat flowing from the openings in a distributing pipe in clearing the valley bottom of frying residue and impelling it upwardly through restricted passages between the pipes and the valley sides.

The illustrated form of frying apparatus is intended for large scale commercial food processing and comprises an elongated fat containing kettle into which dips successively a series of food carriers. These carriers consist of baskets supported by a conveyor. The volume of the kettle is relatively small as compared to prior kettles of commercial usage so that the quantity of fat is more nearly commensurate than in prior kettles for similar use, with the volume of food which may be immersed at any one time. Accordingly, the fat in the present kettle never becomes contaminated by the presence of a high percentage of chemically broken down fat, the proportion of fat carried off on the surface of the food articles and replaced with fresh fat being high enough to avoid such contamination. For this reason it is unnecessary to interrupt the frying operations for the purpose of draining the fat and replacing the entire quantity in the kettle with a fresh supply, such replacement being uneconomical.

The fat in the illustrated kettle has impressed upon it a forced circulation in a manner to avoid overheating and to keep the bottom of the kettle free of any residue resulting from the frying operations. In this respect the apparatus of the present invention is comparable with that disclosed in a copending application for United States Letters Patent, Ser. No. 62,255 filed November 27, 1948 in the name of Kenneth L. Childs, except that that invention is applicable to small individual order frying apparatus, whereas the present invention is most useful in connection with large scale commercial frying operations performed as a continuous process.

Referring more particularly to the drawings, the kettle is indicated at 10, the food carrier baskets at 12 and the conveyor in the form of a pair of parallel link chains 14 running over two pairs of coupled sprocket wheels 16 mounted at the ends of the kettle 10. The sprocket wheels 16 are secured on shafts 18 rotatably mounted at their ends in stanchions 20 bolted to lugs on the edges of the kettle. The shaft at the left end of the kettle, as viewed in Figs. 1 and 2 has secured to one end a chain driven wheel 21 for rotating both conveyor shafts at a slow steady speed determined by the type of food to be processed.

The food is introduced into the baskets by suitable automatic mechanism (not shown) through a chute 22, as the baskets move along the upper reaches of the conveyor chains from left to right in the direction of the arrows 23. The food is immersed in fat at the right end of the kettle as the baskets are lowered from the upper reach of the conveyor to the lower reach. The direction of movement for the carrier baskets is from right to left while the food is immersed as indicated by the arrows 24.

The depth of clear fat in the frying zone of the kettle is relatively shallow, between one and one half and two inches so that the principle of single layer frying may be taken advantage of as disclosed more fully in United States Letters Patent Nos. 2,219,949 and 2,219,950, granted October 29, 1941 upon applications of Kenneth L. Childs. Single layer frying is conducive to quick recovery in the temperature of the fat when cold food is first immersed, particularly with a bottom heated kettle.

After moving the length of the kettle through the frying zone, the baskets are raised from the kettle at the left end and are tilted to empty the food articles contained therein by a cam 26 secured to the sides of the kettle and arranged to engage successively with pins 28 on arms forming the suspension members for the baskets. As the food articles drop from the baskets they fall into a chute 30 for directing them to one side of the kettle where they are packaged and prepared for shipment or for further processing.

To heat the kettle and the fat therein, there is mounted underneath the kettle on a vertical wall 32, a pair of parallel main burners 34 disposed to project their flames against the bottom of the kettle concentrated principally just beneath that section of the kettle where the baskets with cold food are first introduced. This is the section of the kettle where the most heat is required and accordingly the pair of burners 34 is kept continually at their maximum output at all times during operation of the apparatus. Just to the left of the burners 34, between these burners and the other end of the kettle, are two more pairs of toed in supplemental burners 36 and 38. These supplemental burners are not operated continuously but are turned on and off intermittently according to the requirements of the frying apparatus to keep the fat in the kettle at a temperature where the frying will be performed with maximum efficiency. For this purpose the pairs of burners 36 and 38 are controlled either simultaneously or successively as the temperature of the fat in the kettle falls. As illustrated, the two pairs of supplemental burners are controlled simultaneously by an electrical circuit 40 of conventional form including a thermostat 42 secured inside the vertical wall 32 of the kettle (see Fig. 1).

Means is provided, according to the present construction, for circulating the fat lengthwise through the kettle in a direction opposite to that in which the food carriers 12 are moved by the conveyor. To this end the fat is circulated by a distributing system comprising a number of pipes 44 located inside the kettle beneath the normal level of the fat in the frying zone. Each pipe has a series of spaced openings 46 (Fig. 4) along its length, which openings are all directed squarely against the bottom of the kettle. The flow of fat from the openings in the pipes causes the fat in the kettle to circulate and entrain the residue formed during the frying operation, carrying it into an outlet sump 48 at the end of the kettle nearest which the cold food is first introduced. The sump 48 is formed in part by the vertical wall 32 through which the thermostat 42 projects so that the thermostat is located within the sump.

With the arrangement of the spaced openings in the pipes along the length of the kettle and the sump 48 at one end of the kettle the fat is distributed from the pipes in metered amounts for each unit length of the kettle. Since the sump 48 is at the right end of the kettle all of the fat flows toward that end. For each unit length of the kettle measured from right to left the fat vented from the pipes is augmented by the amounts vented from all those unit lengths at the left end opposite the sump 48 so that the fat is circulated at a progressively increasing rate from the closed left end of the kettle toward the sump 48. Since the fat is circulated in a direction opposite that of the movement of the food carriers and the food carriers are moved away from the sump the greatest relative velocity of the fat and food occurs at the location where the cold food is introduced. For this reason the most rapid interchange of heat occurs here also. Furthermore, the arrangement of the main and intermittently operated supplemental burners at the sump end of the kettle causes the heat to be concentrated also on that end of the kettle at which the fat circulation is greatest, the flue gas being exhausted at the end of the kettle opposite the burners so that the full length of the kettle is heated. This arrangement has the advantage that it avoids the tendency of burning the fat at the most highly heated area of the kettle bottom.

Besides distributing the heat in an advantageous manner, the present fat distributing system carries off the frying residue in a particularly desirable manner and deposits it in the sump 48. Most of the frying residue is thrown out shortly after the cold food is first introduced into the kettle. Accordingly, with the sump at that end of the kettle where the cold food is first introduced the residue is entrained and carried off most rapidly along that location where the greatest amount is produced. As the food carriers move toward the closed end of the kettle less residue is given off. Also, bubbles of steam thrown out by the food are similarly greater at the sump end of the kettle where the cold food is introduced so that the fat in which the most steam is entrained is closest to the sump. When the fat reaches the sump its velocity of flow is greatly reduced so that the residue has an opportunity to settle and the steam bubbles to rise in separating themselves from the fat.

Figure 3:
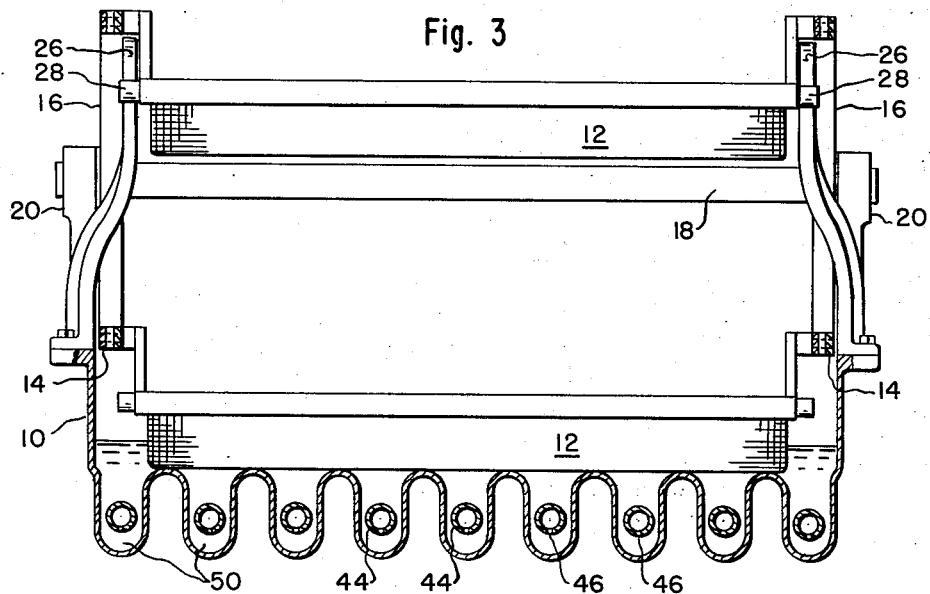
Fig. 3 is a sectional view on an enlarged scale of the apparatus taken along the line III—III of Fig. 1.

As a still further means for insuring entrainment of the frying residue of the illustrated kettle and for preventing a deposit anywhere in the kettle the kettle 10 is constructed with a corrugated bottom having rounded valleys 50, bounded by raised areas, best shown in Figs. 3 and 5. The pipes 44 are located in the valleys beneath the food baskets 12 in the frying zone. These valleys run lengthwise of the kettle and are of such width and depth that restricted passages are formed between the sides of the valleys and the pipes. The vent openings 46 being directed against the kettle bottom inside the valleys, the frying residue is forcibly swept from the bottom and is impelled upwardly through the restricted openings, in the direction of the arrows in Fig. 5. The residue is then swept into the lengthwise current of fat and entrained by the fat as it moves toward the sump 48.

To avoid accumulation of frying residue on the kettle bottom outside the valleys 50 of the corrugations the carrier baskets 12 are made to rest directly on the bottom of the kettle between the valleys. Any frying residue which accumulates on these areas is soon brushed by the moving baskets into the upwardly moving currents of fat produced from the restricted passages between the pipes and the valley side walls. The residue is then impelled upwardly and entrained toward the sump.

The pipes 44 have their ends remote from the sump closed and are all connected to a common header 52 located partly within the sump 48. The header has connected with one end a pipe 54 leading to a liquid circulating pump 56. The suction side of the pump is connected to pipe 58 extending through the bottom of the sump at one side of the kettle, the sump being formed to project beyond the side of the kettle. Within the sump the suction pipe 58 is surrounded by a strainer 60 for separating the frying residue from the fat in the sump.

When it is necessary to remove the fat from the kettle at the end of the run, the kettle may readily be cleaned within the valleys of the corrugated bottom merely by raising the closed ends of the pipes 54, the header 52 rotating as the pipes are lifted and the end of the pipe 54 turning in the header. If it is necessary to remove the pipes, disconnectable slip couplings may be employed in the joints. The conveyor shaft 18 may be removed temporarily from its bearings and raised to facilitate cleaning and pipe raising operations. For convenience in cleaning in one construction of the conveyor it is mounted on a framework which rests in the frying kettle. The whole conveyor system then can be lifted out as a unit with a chain fall, without removing any bolts or doing anything but taking off the conveyor drive chain.

It is evident from the constructions described that an extremely efficient heating and frying action is obtainable. The mechanical circulation of the fat also produces much more rapid heat transfer when the fat is directed directly against the bottom heating surface. This also agitates the fat next to the surface much more rapidly and prevents local overheating of the fat film next to the heated surface. This, of course, helps to prolong the fat life greatly and to maintain the quality of the fat.

The nature and scope of the invention having been indicated and a specific embodiment having been described, what is claimed is:

1. Frying apparatus for the treatment of food articles, having an elongated fat containing kettle and food carriers in the kettle, in combination with a fat distributing system comprising a pipe running within and lengthwise of the kettle beneath the level of the fat therein and having a series of openings spaced along the pipe and directed against the bottom of the kettle to clear the bottom of the kettle of frying residue and a sump at one end of the kettle to receive the fat flowing from the pipe and to collect the frying residue from the food in the carriers.

2. Frying apparatus for the treatment of food articles, having an elongated kettle formed with a corrugated bottom, the valleys of which run lengthwise of the kettle and heating means acting on the bottom of the kettle to raise the fat therein to a proper frying temperature, in combination with a fat distributing system comprising a pipe in one of the valleys, having a series of spaced openings along the pipe directed against the bottom of the valley to clear said valley of frying residue thrown off from the food articles in the kettle.

3. Frying apparatus for the treatment of food articles, having an elongated kettle formed with a valley bounded by raised areas running lengthwise of the kettle and means acting on the bottom of the kettle to heat the fat therein to a proper frying temperature, in combination with a fat distributing system comprising a pipe in the valley, having a series of spaced openings along its length, an outlet sump at one end of the kettle to cause the fat to circulate at a progressively increasing rate along the kettle toward the sump, a food carrier resting on raised areas of the kettle bottom and a conveyor for the carrier moving in a direction opposite to the circulation of the fat to brush the frying residue from the raised areas of the kettle bottom into said valley.

4. Frying apparatus for the treatment of food articles, having an elongated kettle formed with a corrugated bottom, the valleys of which run lengthwise of the kettle, in combination with a fat distributing system comprising pipes in each of the valleys inside the kettle and a series of spaced openings along each pipe directed against the bottom of the valley containing it for causing the fat to circulate at a progressively increasing rate from one end of the kettle to the other and to clear the kettle bottom within said valleys of frying residue and means for heating the bottom of the kettle concentrated on that end of the kettle at which the fat circulation is greatest.

5. Frying apparatus for the treatment of food articles, having an elongated kettle formed with a corrugated bottom, the valleys of which run lengthwise of the kettle, in combination with a fat distributing system comprising pipes in the valleys inside the kettle and a series of spaced openings along each pipe directed against the bottoms of the valleys for causing the fat to circulate at a progressively increasing rate from one end of the kettle to the other and to clear the kettle bottom within said valleys of frying residue, main means for heating the bottom of the kettle concentrated at the end at which the fat circulation is greatest and supplemental heating means acting intermittently between the main heating means and the other end of the kettle.

6. Frying apparatus for the treatment of food articles, having an elongated shallow kettle formed with a plurality of corrugations in its bottom, means acting on the bottom of the kettle to heat it, food carriers in the kettle, and a conveyor for moving the food carriers from one end of the kettle to the other, in combination with a fat distributing system comprising pipes in the valleys of the corrugations, each pipe having a series of spaced openings along its length directed against the corresponding valley bottom to clear the frying residue from its valley and to circulate the fat and entrained residue along the kettle at a progressively increasing rate in a direction opposite the movement of the carriers.

7. Frying apparatus for the treatment of food articles, having an elongated shallow kettle formed with a plurality of corrugations in its bottom, heating means acting on the kettle bottom, food carriers in the kettle and a conveyor for moving the food carriers from one end of the kettle to the other, in combination with a fat distributing system comprising pipes in the valleys of the corrugations, each pipe having a series of spaced openings along its length directed against the corresponding valley bottom to circulate the fat and entrained frying residue along the kettle at a progressively increasing rate in a direction opposite the movement of the carriers and a sump at that end of the kettle at which the fat circulation is greatest.

8. Frying apparatus for the treatment of food articles, having an elongated shallow kettle formed with a plurality of corrugations in its bottom, heating means acting on the kettle bottom, food carriers in the kettle and a conveyor for moving the food carriers from one end of the kettle to the other, in combination with a fat distributing system comprising pipes in the valleys of the corrugations, each pipe having a series of spaced openings along its length directed against the corresponding valley bottom to circulate the fat and entrain the frying residue along the kettle at a progressively increasing rate in a direction opposite the movement of the carriers, each pipe having such size relative to the width of the valleys of the corrugations that restricted passages are formed between the pipes and the sides of the valleys to cause the frying residue to be impelled upwardly from the valleys before being entrained along the kettle.

9. Frying apparatus for the treatment of food articles, having an elongated shallow kettle formed with a plurality of corrugations in its bottom, heating means acting on the bottom of the kettle, food carriers in the kettle and a conveyor for moving the food carriers from one end of the kettle to the other, in combination with a fat distributing system comprising pipes in the valleys of the corrugations, each pipe having a series of spaced openings along its length directed against the corresponding valley bottom to entrain the frying residue along the kettle at a progressively increasing rate in a direction opposite the movement of the carriers and a sump at that end of the kettle at which the fat circulation is greatest, each pipe having such size relative to the width of its containing valley that restricted passages are formed between the pipes and the sides of the valleys to cause the frying residue to be impelled upwardly first and then to be entrained by the fat as it moves toward the sump thereafter.

OLOF P. PIERSON.

REFERENCES CITED

The following references are of record in the file of this patent:

UNITED STATES PATENTS

| Number | Name | Date |
|---|---|---|
| 740,837 | Fesenmeier | Oct. 6, 1903 |
| 1,234,131 | Cleveland | July 24, 1917 |
| 1,401,945 | Morris | Dec. 27, 1921 |
| 1,926,313 | Smith | Sept. 12, 1933 |
| 2,112,309 | Santillan | Mar. 29, 1938 |
| 2,360,727 | Shaw | Oct. 17, 1944 |
| 2,418,519 | McBeth | Apr. 8, 1947 |
| 2,429,360 | Kellis | Oct. 21, 1947 |
| 2,469,026 | Barstad | May 3, 1949 |